Oct. 31, 1950

H. SINCLAIR 2,527,658

TORQUE LIMITING MEANS FOR TORQUE
TRANSMITTING MECHANISMS

Filed March 20, 1945

3 Sheets-Sheet 1

INVENTOR
Harold Sinclair
BY
ATTORNEYS

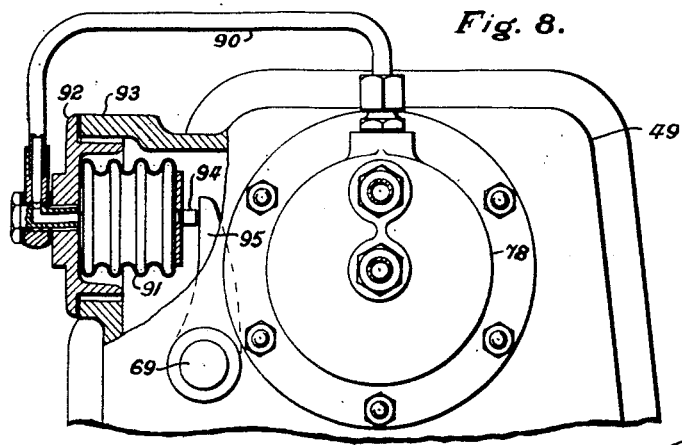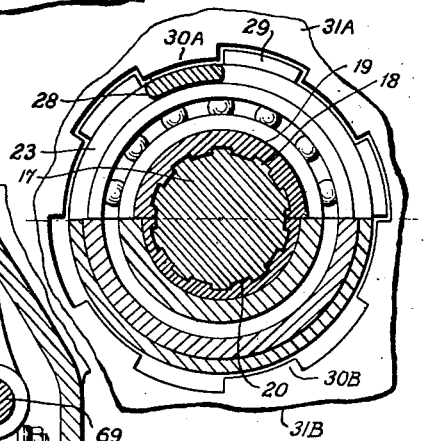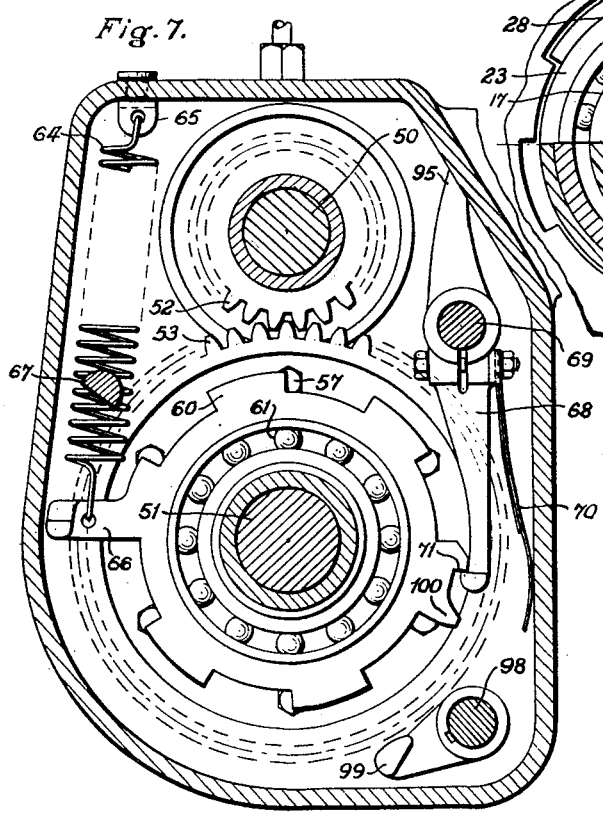

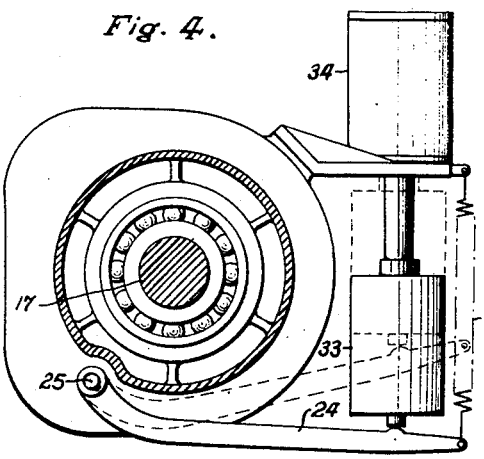
Fig. 4.
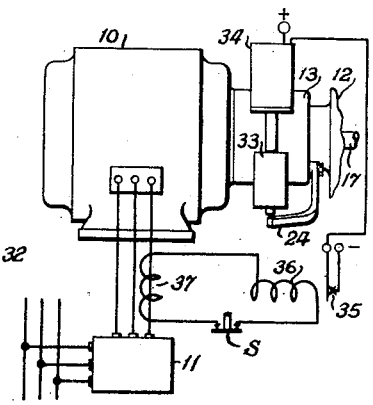
Fig. 5.
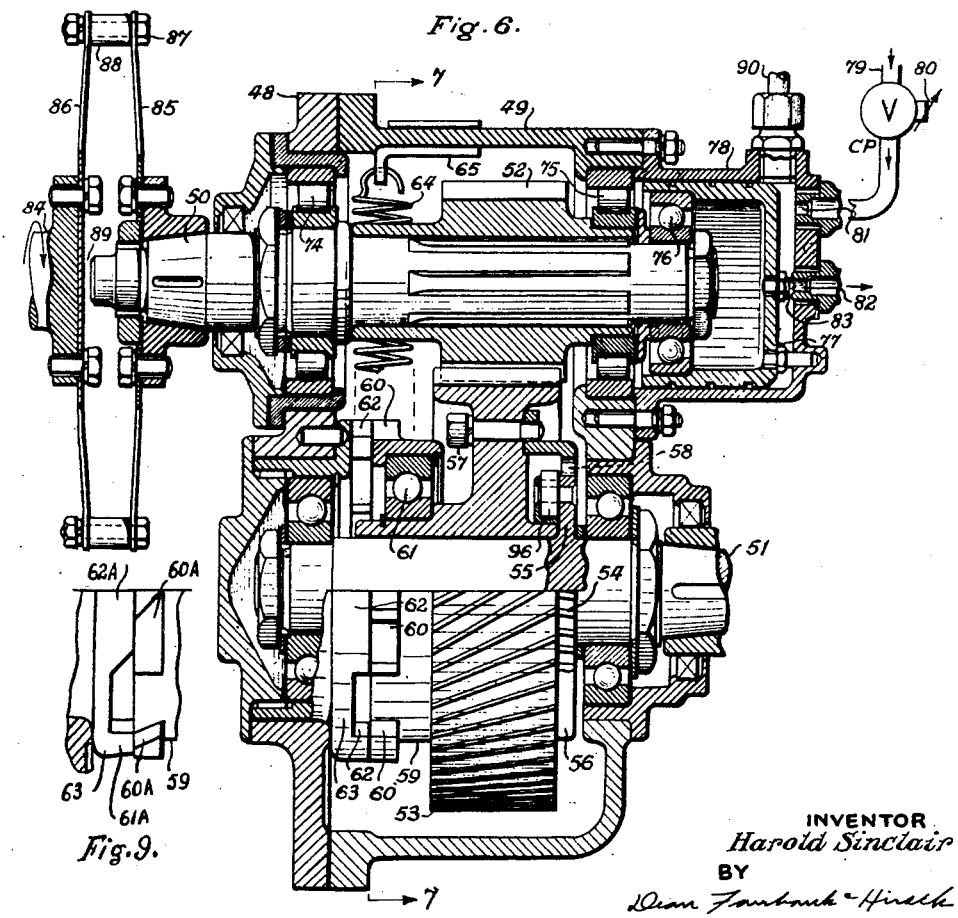
Fig. 6.
Fig. 9.
INVENTOR
Harold Sinclair
BY
ATTORNEYS Patented Oct. 31, 1950

2,527,658

UNITED STATES PATENT OFFICE 2,527,658

TORQUE LIMITING MEANS FOR TORQUE TRANSMITTING MECHANISMS

Harold Sinclair, London, England

Application March 20, 1945, Serial No. 583,800
In Great Britain March 8, 1944

14 Claims. (Cl. 74—411)

This invention relates to trip mechanism adapted to interrupt the power path through torque-transmission mechanism when the torque rises to a predetermined value.

When co-operating dogs or splines are used in such torque-limiting mechanism and are required to slide over one another under heavy load for the purpose of interrupting a drive, the difficulty often arises that an inconveniently large force is necessary to cause such sliding; also the high spots on the co-operating loaded surfaces may pick up metal one from the other. Hence the mechanism is liable to stick and be unreliable in action. Furthermore, as the dogs slide out of engagement the specific loading on their co-operating faces rises at the ends to an extreme value causing progressive wear at the ends leading to failure.

Accordingly an object of this invention is to arrange that, in torque-limiting mechanism having co-operating dogs or splines that are required to slide in order to interrupt the drive, the torque load on the dogs or splines is substantially reduced immediately the torque is required to be released and before sliding occurs.

Another object of this invention is to provide such torque-limiting mechanism which will ensure a positive drive so long as the torque remains below the critical value, which will give a substantially instantaneous release of torque when the critical value is attained, and which can be easily reset to re-establish the power path.

A further object is to enable the improved torque-limiting mechanism to be reset by imparting a suitable motion to the input member of the torque-transmission mechanism, or to both the input member and to another element of the mechanism.

Figure 1:
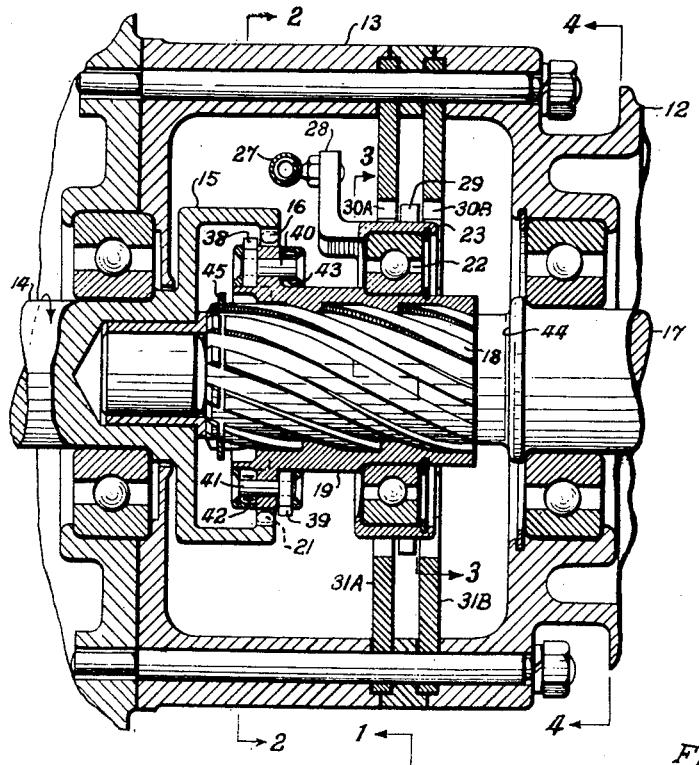
Figure 2:
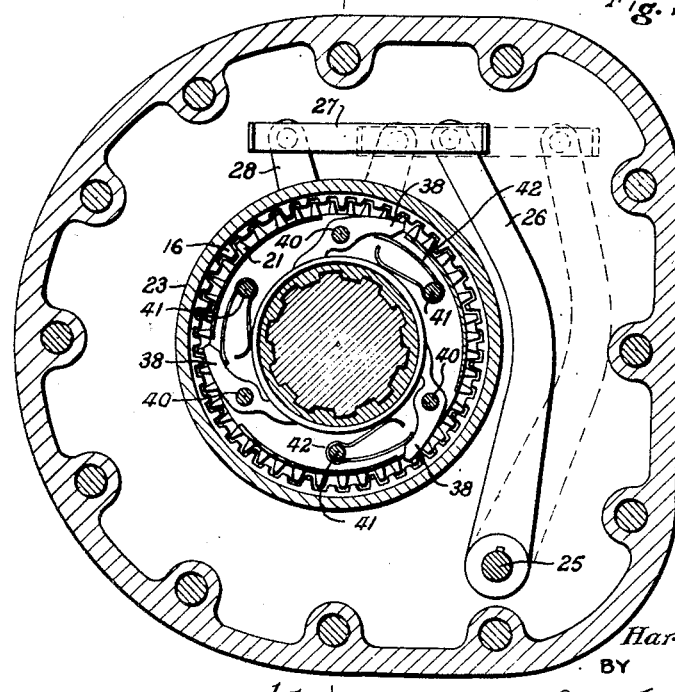

Two embodiments of the invention will be described by way of example with reference to the accompanying diagrammatic drawings, in which:

Fig. 1 is a sectional side elevation, on the line 1—1 in Fig. 2, of a jaw-clutch arranged in accordance with the invention, Figs. 2 and 3 are respectively sections on the lines 2—2 and 3—3 in Fig. 1, Fig. 4 is a section, to a smaller scale, on the line 4—4 in Fig. 1, Fig. 5 is a side elevation of the clutch shown in Figs. 1 to 4, with a driving motor and associated electrical circuits, Fig. 6 is a sectional side elevation of a gear transmission in accordance with the invention, Fig. 7 is a section on the line 7—7 in Fig. 6, Fig. 8 is an end elevation of part of the apparatus shown in Fig. 6, as seen from the right-hand end of that figure, and Fig. 9 is a side elevation showing a modification of a detail of the transmission shown in Fig. 6.

In the arrangement shown in Fig. 5, a reversible electric A. C. motor 10 provided with a reversing controller 11 drives a driven machine 12 through a clutch generally denoted by 13. The motor shaft 14 (Fig. 1) is rigid with a drum 15 having internal jaw-clutch teeth 16. The driven machine 12 has an input shaft 17 provided with right-handed helical splines 18. An intermediate slidable clutch dog 19 has internal splines 20 engaged with the splines 18 and jaw-clutch teeth 21 engageable with the teeth 16. The helix angle of the splines is such (e. g. 15° to 30°) that normal torque, under static or running conditions as required, will, in the absence of axial restraint on the dog 19, throw this dog out of engagement with the teeth 16 of the motor shaft 14.

The axial force on the sliding dog 19 is taken through a bi-directional thrust bearing 22 to a thrust abutment ring 23 co-axial with the shafts 14 and 17 and capable of being rocked by a lever 24 (Fig. 4) operating through a shaft 25, a lever 26 (Fig. 2), a link 27 and a lug 28 rigid with the rocking and sliding abutment ring 23. This ring is provided with radial teeth 29 normally abutting teeth 30A or 30B of fixed abutment members 31A and 31B whereby the sliding dog 19 is prevented from sliding axially in either direction and disengaging its teeth 21 from the teeth 16.

If it is assumed that the motor 10 is running in the direction indicated by the arrow on the shaft 14 in Fig. 1 (which will hereinafter be termed the forward direction) and driving the driven machine 12, the reaction of the helical splines 18 and 20 will urge the dog 19 to slide to the right. If it is further assumed that the lever 24 and the parts 25—28 are in the positions shown by dotted lines in Figs. 2 and 4, the teeth 29 on the movable abutment ring 23 will be in position to abut axially against the teeth 30B, whereby the sliding dog 19 is held in its engaged condition. In a similar way, if the motor is driving in the backward direction of rotation, the teeth 29 and 30A will co-operate to prevent the dog 19 from sliding to the left.

The lever 24 is biased towards its normal position by a tension spring 32 (Fig. 4) and can be tripped by a weight 33 normally kept raised by a solenoid 34 which is energised from a continuously live current source through back contacts 35 of an A. C. relay 36 (Fig. 5). The energising coil of this relay is excited by a current transformer 37 the primary conductor of which carries current to the motor 10. The relay is adjusted to operate when the motor current rises to a predetermined overload value; the relay is therefore indirectly responsive to motor torque.

When an overload occurs, the relay operates to deenergise the solenoid, and the weight 33 is released, tripping the lever 24 to the position shown in full lines in Fig. 4. The movable abutment ring 23 is accordingly rocked to the position in which it appears in Fig. 3, and the dog 19 is thereby permitted to slide in either axial direction, as determined by the direction of the torque transmitted by the helical splines 18 and 20, so that the clutch teeth 16 and 21 are disengaged. It will thus be apparent that, when an overload occurs, the restraint to axial movement of the sliding dog 19 is immediately removed and this dog is thereby freed from torque load other than the negligible torque required to make the dog disengage itself. Thus no parts of the co-operating faces of the teeth 16 and 21 and of the splines 18 and 20 are subjected to high specific loading during tripping.

The dog 19 is provided with two sets of pawls 38 and 39 adapted to co-operate with the teeth 16 when the dog teeth 21 are disengaged behind and in front of respectively the teeth 16. The pawls 38 and 39 are pivotally mounted on pins 40 and 41 respectively. Springs 42 and 43, located respectively by the pins 41 and 40, load the pawls 38 and 39. The noses of the pawls 38 are directed clockwise, as viewed from the left-hand side of Fig. 1, so that, when the dog 19 is disengaged under forward overload torque and abuts a stop 44, these pawls are operative to transmit backward torque between the teeth 16 and the dog 19; thus, on application of backward torque, one or other of the pawls 38 will engage a tooth 16 and cause the helical splines 18 and 20 to co-operate and slide the dog 19 to the left, so that the teeth 16 and 21 re-engage cleanly under the registering action of the operative pawl. The noses of the pawls 39 are directed counter-clockwise, as viewed also from the left-hand side of Fig. 1, so that, when the dog 19 is disengaged under backward overload torque and abuts a stop 45, these pawls are operative to transmit forward torque between the teeth 16 and the dog 19 and likewise cleanly re-engage the jaw clutch. By this arrangement, after the drive has been interrupted by an overload and the mechanism has ceased to rotate, the jaw clutch can be caused to reengage itself by rotating the motor shaft 14 momentarily in the direction opposite to that in which it was driving when the overload occurred. Since the solenoid 34 will by now have been re-energised, the spring 32 tends to rock the abutment ring 23 clockwise from the position in which it appears in Fig. 3, and, as the jaw-clutch teeth 16 and 21 become fully re-engaged, the abutment ring 23 becomes centred between the fixed abutment members 31A and 31B and rocks back to its normal working position. The relay energising circuit can be momentarily opened by a switch S while the motor is being started in order to prevent the clutch from tripping under the influence of the starting current.

In the embodiment shown in Figs. 6, 7 and 8 an input shaft 50 of a speed-reducing gear combined with a jaw clutch drives an output shaft 51 through a helical-tooth pinion 52 fast on the shaft 50 and in constant mesh with a gear wheel 53 on the shaft 51. The shaft 50 is intended to be driven normally in the direction indicated by the arrow in Fig. 6. The mechanism is enclosed in a gear case 49 having an end cover 48.

The gear wheel 53 has left-handed teeth of 15° to 30° helix angle and is rotatable and slidable on the shaft 51 which is provided with a flange 55 having helical jaw-clutch teeth 54; these teeth are right-handed, the helix angle being 15° to 7½°. A ring 56, fixed by screws 57 to the wheel 53, has internal jaw-clutch teeth 58 which, when the hub of the wheel is abutting the flange 55, are engaged with the teeth 54. A movable abutment ring 59 having teeth 60 is mounted by means of a thrust bearing 61 on the gear wheel 53. The teeth 60 co-operate with teeth 62 on an abutment ring 63 fast in the gear cover 48.

The movable abutment ring 59 is urged in a clockwise direction, as viewed from the left-hand side of Fig. 6, by a tension spring 64 (Fig. 7) extended between an anchorage 65 on the gear case and a lug 66 on the ring 59. A stop pin 67, fixed to the gear cover 48, co-operates with the lug 66 to limit rocking of the ring 59 in the clockwise direction. The ring 59 is normally held in the position in which it appears in Fig. 7 by a detent 68 fast on a shaft 69 and urged by a spring 70 into engagement with a ratchet tooth 71 on the ring 59. When the detent 68 is released from the tooth 71, the spring 64 displaces the abutment ring 59 to a position such that its teeth 60 register with the gaps between the teeth 62 of the fixed abutment ring. The gear wheel 53 is consequently free to slide, under the influence of the reaction on its helical teeth, towards the fixed abutment ring 63 and so disengage the jaw-clutch teeth 54 and 58, this disengaging movement being assisted by the reaction due to the helical form of these jaw-clutch teeth.

The clutch is tripped out on torque overload by means which are loaded by the axial thrust developed in the pinion 52 owing to reaction of the torque load on its helical teeth.

The shaft 50 is carried by roller bearings 74 and 75, which are housed in the gear cover 48 and gear case 49 respectively and which permit slight axial displacement of the shaft 50. A ball thrust bearing 76 has its inner race fast on the shaft 50 and its outer race housed in a hydraulic piston 77 operating in a fixed cylinder 78. Oil supplied at 79 by a pump, not shown, passes through a constant-pressure valve V/CP having an adjustment 80 operable for setting the constant outlet pressure to different values. Oil from this valve enters the cylinder 78 through a restriction 81 and normally leaves it by a restricted exhaust port 82 which co-operates with a conical valve 83 fast on the piston 77.

The shaft 50 is coupled to a driving shaft 84 by an axially flexible coupling consisting of two star-shaped spring steel members 85 and 86 fixed to the shafts 50 and 84 and joined point to point by bolts 87 and spacers 88. Axial clearance at 89 between the shaft 50 and the star member 86 limits the axial movement of the shaft 50 to the left, since the shaft 84 is incapable of appreciable axial displacement. The sizes of the restriction 81 and the oil exhaust port 82 are so selected, in relation to the constant oil pressure and the thrust load on the pinion 52, that the oil pressure normally existing in the cylinder 78, when the shaft 50 is at the left-hand limit of its range of axial movement and the valve 83 is therefore spaced by the maximum distance from the port 82, is sufficient to overbalance the maximum normal thrust and thus maintain zero clearance at 89, but that when the torque rises to a predetermined overload, the torque reaction overcomes the hydraulic thrust and displaces the piston 77 progressively to the right into the position in which it appears in Fig. 6, so that the valve 83 gradually closes the port 82.

The cylinder 78 communicates by a pipe 90 with the interior of a resilient hydraulic bellows 91 (Fig. 8) mounted on a plug 92 screwed into a boss 93 on the gear case 49. The bellows terminates in a stud 94 co-operating with a lever 95 rigid with the detent 68.

When a torque overload occurs and the piston 77 is thereby moved to the right, the oil pressure in the cylinder 78 is increased owing both to the progressive closing of the port 82 by the valve 83 and also to the relatively rapid reduction in the volume of the space between the piston 77 and the head of the cylinder 78. This increase in oil pressure is transmitted by the pipe 90 to the bellows 91 which thereupon actuate the rocking shaft 69 that carries the detent 68; consequently the detent is disengaged from the ratchet tooth 71 and the clutch is free to disengage. Figs. 7 and 8 show the parts in their normal running positions, the movable abutment ring being locked in the position which it normally occupies and the clutch being engaged; Fig. 6 shows the shaft 50 and the piston 77 in the positions which they ocupy under overload torque; however, the movable abutment ring 59 has not yet been displaced by the spring 64 and the clutch teeth 54 and 58 are therefore still engaged.

After the clutch has been tripped out, since the torque load on the gear has vanished, the shaft 50 and the hydraulic piston 77 are returned to their normal position by the oil pressure in the cylinder 78, and the opening of the valve 82, 83 restores this pressure to its normal value so that the spring 70 returns the detent 68 to its normal position. The jaw-clutch teeth 58 now co-operate with a set of pawls, such as 96 which are pivotally mounted on pins, such as 97, fast in the flange 55 and the noses of which are directed counter-clockwise as viewed from the left of Fig. 6.

In order to re-engage the clutch a shaft 98 (Fig. 7) is urged by any suitable actuating means (not shown) in a clockwise direction and causes a resetting lever 99 to engage a resetting tooth 100 on the abutment ring 59 and prepare to rock this ring towards the position in which the detent 68 will re-engage behind the ratchet tooth 71. At the same time either the input shaft 50 is rocked backwards through a small angle, or, if the input shaft is stationary, the output shaft 51 is caused to creep forwards through a small angle; either of these manoeuvres causes one of the jaw-clutch teeth 58 to engage one of the pawls 96 which thereupon prevents the gear-wheel 53 from rotating freely on the shaft 51. The torque load thereby established through the gearing causes a reaction on the helical teeth of the wheel 53 such as to slide this wheel to the right, as viewed in Fig. 6, this sliding being assisted by the reaction due to the pressure of the pawl on the helical jaw-clutch tooth 58 with which it is engaged. Consequently the jaw-clutch teeth 58 engage cleanly with the teeth 54 under the registering action of the pawl. As soon as the jaw-clutch teeth are fully engaged, the abutment teeth 60 slip round the corners of the abutment teeth 62 under the influence of the resetting lever 99, and the detent 68 re-engages and locks the clutch in its engaged condition. The resetting shaft 98 is now rocked back to its original position.

In apparatus according to the invention, by selection of a suitable angle of inclination in relation to the angle of friction of the co-operating torque-transmitting faces, the axial component of the reaction at the inclined faces on the slidable member of the clutch can be made such that the force required to be transmitted through the abutment means is relatively small, so that the abutment means can be easily operated to trip the drive under load.

Where a pawl is not provided for registering the jaw-clutch teeth for re-engagement and where the abutment means comprise the above-described co-operating toothed rings or equivalent devices, the teeth on these rings may have their flanks helically inclined in such a manner that, after the drive has been tripped, the jaw-clutch can be re-engaged by urging the rockable abutment ring in the direction opposite to that in which it moves to trip the drive and thus urging the jaw-clutch towards re-engagement and at the same time slowly rotating the input member backwards so as to bring the jaw-clutch elements first into register and thereafter into full engagement with each other. Such an arrangement is shown in Fig. 9, where the teeth 60A and 62A with helically inclined flanks replace the teeth 60 and 62 respectively of the corresponding mechanism shown in Fig. 6. When the teeth 60A and 62A are intermeshed, rotation of the member 59 counterclockwise as viewed from the left will cause the inclined tooth faces to ride over each other and so cause the wheel 53 to be slid to the right.

Torque-limiting mechanism according to this invention is particularly suitable for transmission systems capable of transmitting heavy torque, or intended to run at high rotational speed, or having rotary elements of considerable inertia, since the clutch is self-disengaging once the restraint afforded by the abutment means has been removed by a controlling force which, as already mentioned, may be relatively light.

It is not essential that the jaw-clutch should normally rotate: for instance it may serve to anchor any torque-transmitting element that is required to be released for rotation only when overloaded.

I claim:

1. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, controllable abutment means which serve normally to resist such sliding of said intermediate element, an energy storing device for urging said abutment means to a non-abutting position, and a device responsive to torque in the mechanism and co-operating with said abutment means for retaining them in their abutting position when the torque is less than a predetermined value and for releasing them for movement under the influence of said energy storage device when the torque rises to the said value.

2. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, abutment means comprising a first member constrained to move axially with said intermediate element and having an abutment surface facing axially, and a second member for co-operation with said abutment surface to resist such sliding of the intermediate member, said first and second abutment members being relatively movable from abutting to non-abutting relationship, an energy storage device co-operating with said abutment means for effecting such relative movement and thereby permitting disengagement of said disengageable pair of co-operating torque-transmitting faces, and a device responsive to torque in the mechanism and operatively connected with said abutment means for preventing said relative movement only while the torque is below a predetermined value.

3. Torque-limiting mechanism including a first torque-transmitting element, a second torque-transmitting element, said elements having respectively torque-transmitting faces, an intermediate element slidable relative to said first and second elements and having torque-transmitting faces co-operating with the said first and second elements, at least one pair of said co-operating faces being oblique to the direction of such sliding so that torque applied to the mechanism in at least one direction tends to slide said intermediate element in such a direction as to disengage one pair of said co-operating faces, a first toothed abutment member mounted on said intermediate element, a second toothed abutment member co-operating with said first abutment member for normally resisting such sliding of said intermediate element, and torque responsive means operatively connected to at least one of said abutment members and capable of causing relative rotation of said abutment members, in response to rising of the torque to a predetermined value, said rotation bringing the abutment teeth out of abutting relationship into register for intermeshing and thereby permitting disengagement of said pair of co-operating torque-transmitting faces.

4. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, a first toothed abutment member mounted by means of a thrust bearing on said intermediate element, a second toothed abutment member mounted on a fixed member and co-operating with said first abutment member, and torque-responsive means operatively connected to at least one of said abutment members and capable of causing relative rotation of said abutment members, in response to rising of the torque to a predetermined value, said rotation bringing the abutment teeth out of abutting relationship into register for intermeshing and thereby permitting disengagement of said pair of co-operating torque-transmitting faces.

5. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, a toothed abutment ring mounted by means of a thrust bearing on said intermediate element, a fixed toothed abutment member co-operating with said abutment ring, and torque-responsive means operatively connected with said abutment ring and capable, in response to increase of torque to a predetermined value, of causing rotation of said abutment ring from a position in which the abutment teeth are in abutting relationship to one in which they are in non-abutting position and can interengage and thereby permit disengagement of said disengageable pair of torque-transmitting faces.

6. Torque-limiting mechanism including two co-axial torque-transmitting elements, jaw-clutch teeth on the first of said elements, helical teeth on the second of said elements, a slidable dog having both helical teeth meshing with said helical teeth on the second element and also jaw-clutch teeth engageable with said jaw-clutch teeth on the first element, the reaction of torque on said helical teeth tending to slide said dog and thereby disengage said jaw-clutch teeth, movable abutment means capable in an operative condition of resisting such sliding of the dog and in a non-abutting position of permitting such disengagement, and means responsive to torque in the mechanism and operatively connected with said abutment means for changing them to the non-abutting position when the torque rises to a predetermined value.

7. Torque-limiting mechanism including two torque transmitting elements disposed with their axes parallel, a helical-tooth gear-wheel train which is composed of at least two gear wheels disposed co-axially with said elements respectively and which serves to transmit torque between said elements, jaw-clutch teeth on one of said wheels engageable with jaw-clutch teeth on one of said elements, the reaction of torque on the helical teeth tending to slide said one wheel and thereby disengage said jaw clutch teeth, movable abutment means capable in an operative condition of resisting such sliding of said one wheel and in a non-abutting position of permitting such disengagement, and means responsive to torque in the mechanism and operatively connected with said abutment means for changing them to the non-abutting position when the torque rises to a predetermined value.

8. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in one direction tends to slide said intermediate element in such a direction as to disengage one pair of said co-operating faces, abutment means which serve normally to resist such sliding of said intermediate element and which are displaceable to a non-abutting position, a device responsive to torque in the mechanism and operatively connected to said abutment means for rendering them inoperative and thereby permitting such disengagement when the torque rises to the predetermined value, a pawl mounted on one of said first and intermediate elements and capable of co-operating with the disengageable torque-transmitting faces on the other of said first and intermediate elements, when said faces are disengaged, said pawl being operative to transmit torque between said first and intermediate elements in the opposite direction so that the said helical torque-transmitting faces will cause said intermediate element to slide in the axial direction such that said disengageable faces will re-engage cleanly under the registering action of said pawl.

9. Torque-limiting mechanism for transmitting torques in both directions and including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torques applied to the mechanism in the two directions tend to slide said intermediate element in the one and the other axial direction respectively and in each case to disengage one pair of said co-operating faces, abutment means which serve normally to resist sliding of said intermediate element and which are displaceable to a non-abutting position, and a device responsive to torques in both directions in the mechanism and operatively connected to said abutment means for rendering them inoperative and thereby permitting said intermediate element to slide in either axial direction when torque, irrespective of its direction, rises to a predetermined value.

10. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, abutment means serving normally to resist such sliding of said intermediate element and including two co-operating abutment members relatively displaceable for the purpose of permitting said sliding, biasing means tending to effect such relative displacement of said abutment members, and means which are responsive to torque in said mechanism, which are connected with said abutment means, which normally prevent said biasing means from operating and which permit such operation in response to rising of said torque to a predetermined value.

11. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in the driving direction tends to slide said intermediate element in such a direction as to disengage one pair of said co-operating faces, abutment means which serve normally to resist such sliding of said intermediate element and which are displaceable to a non-abutting position, a device responsive to driving torque in the mechanism and operatively connected to said abutment means for rendering them inoperative, thereby permitting such disengagement when the torque rises to the predetermined value, a resetting control operable for urging said abutment means into their operative condition, and means for temporarily imparting to said first and second elements a relative rotation in an overrunning direction.

12. In combination, an electric motor, a driven machine, torque-limiting mechanism drivably connecting said motor and said machine and including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, abutment means serving normally to resist such sliding of said intermediate element, biasing means tending to displace said abutment means and thereby permit said sliding and electro-magnetic means responsive to current supplied to said motor and operatively connected to said biasing means for causing them to operate in response to rising of said current to a predetermined value.

13. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, the one of said first and second elements that has the said inclined torque-transmitting faces being axially movable under the influence of torque reaction on said inclined faces, loading means serving to oppose such axial movement of the said one element, and abutment means which are operatively connected with said loading means and which serve normally to resist the said sliding of the intermediate element but to permit the last said sliding in response to said axial movement of the said one element.

14. Torque-limiting mechanism including a first torque-transmitting element, a second torque-transmitting element, said elements having respectively torque-transmitting faces, an intermediate element slidable relatively to said first and second elements and having torque-transmitting faces co-operating with the said faces on said first and second elements, at least one pair of said co-operating faces being oblique to the direction of such sliding so that torque applied to the mechanism in at least one direction tends to slide said intermediate element in such a direction as to disengage one pair of said co-operating faces, thrust-responsive means which are arranged to resist the axial thrust that normally occurs on one of said elements that has said inclined torque-transmitting faces but to respond to the said thrust under overload conditions, and abutment means which serve normally to resist the said sliding of the intermediate element but which are operatively associated with said thrust-responsive means so as to permit such sliding in response to the occurrrence of the said overload conditions.

HAROLD SINCLAIR.

REFERENCES CITED

The following references are of record in the file of this patent:

UNITED STATES PATENTS

| Number | Name | Date |
| --- | --- | --- |
| 833,088 | Robert | Oct. 9, 1906 |
| 871,227 | Ljungstrom | Nov. 19, 1907 |
| 2,068,260 | Biggert, Jr. | Jan. 19, 1937 |
| 2,148,481 | Le Frank | Feb. 28, 1939 |
| 2,151,493 | Acker | Mar. 21, 1939 |